(12) United States Patent
Moganty et al.

(10) Patent No.: US 9,627,713 B2
(45) Date of Patent: Apr. 18, 2017

(54) COMPOSITE ELECTROLYTE INCLUDING POLYMERIC IONIC LIQUID MATRIX AND EMBEDDED NANOPARTICLES, AND METHOD OF MAKING THE SAME

(71) Applicant: NOHMs Technologies, Inc., Rochester, NY (US)

(72) Inventors: Surya S. Moganty, Henrietta, NY (US); Jonathan Lee, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 0 days.

(21) Appl. No.: 14/229,539

(22) Filed: Mar. 28, 2014

(65) Prior Publication Data

US 2016/0164137 A1     Jun. 9, 2016

Related U.S. Application Data

(60) Provisional application No. 61/806,568, filed on Mar. 29, 2013, provisional application No. 61/971,443, filed on Mar. 27, 2014.

(51) Int. Cl.
*H01M 10/0525* (2010.01)
*H01M 10/0565* (2010.01)

(52) U.S. Cl.
CPC ... *H01M 10/0565* (2013.01); *H01M 10/0525* (2013.01); *H01M 2300/0022* (2013.01); *H01M 2300/0082* (2013.01); *H01M 2300/0085* (2013.01)

(58) Field of Classification Search
CPC ......... H01M 10/0565; H01M 2220/20; H01M 2300/0082
USPC ...................................................... 429/306
See application file for complete search history.

(56) References Cited

U.S. PATENT DOCUMENTS

| | | | |
|---|---|---|---|
| 2006/0120021 A1* | 6/2006 | Banno | C07C 219/08 361/502 |
| 2012/0231346 A1* | 9/2012 | Tsujii | H01G 9/038 429/306 |

FOREIGN PATENT DOCUMENTS

| | | | | |
|---|---|---|---|---|
| JP | WO 2011049113 A1 * | 4/2011 | | H01G 9/038 |
| WO | WO 2013009731 A2 * | 1/2013 | | H01M 10/052 |

OTHER PUBLICATIONS

Bara et al., Synthesis and light gas separations in cross-linked gemini room temperature ionic liquid polymer membranes, May 2008, 316, 186-191.*
Lu et al., Ionic liquid-nanoparticle hybrid electrolytes, Jan. 2012, Journal of Materials Chemistry, 22, 4066-4072.*

* cited by examiner

*Primary Examiner* — Sean P Cullen
(74) *Attorney, Agent, or Firm* — Joseph M. Noto; Bond, Schoeneck & King PLLC

(57) ABSTRACT

A composite electrolyte comprising includes a polymeric ionic liquid matrix; and a plurality of functionalized nanoparticles embedded therein, wherein at least one of a nitrogen cation moiety, a phosphorus cation moiety, and a sulfur cation moiety is tethered to the nanoparticle.

23 Claims, 13 Drawing Sheets

Polymerizable anions

Polymerizable Nanoparticles

Scheme 1. Schematic representation of the method to produce poly(ionic liquid) based ion conducting membranes.

COMPOSITE ELECTROLYTE INCLUDING POLYMERIC IONIC LIQUID MATRIX AND EMBEDDED NANOPARTICLES, AND METHOD OF MAKING THE SAME

INCORPORATION BY REFERENCE

All patents, patent applications and publications cited herein are hereby incorporated by reference in their entirety in order to more fully describe the state of the art as known to those skilled therein as of the date of the invention described herein.

TECHNICAL FIELD

This technology relates generally to electrolytes. In particular, this invention relates to non-flammable, non-volatile electrolytes useful for lithium ion transport. The technology also relates electrolytes useful in energy storage systems suitable for use in electric drive vehicles.

BACKGROUND

As the global market for electric vehicles grows over the next several years, lithium (Li) batteries are emerging as the technology of choice for auto manufacturers. Energy storage units for EV applications require high charge and discharge rates, long lifetimes, high energy density, and above all else, safe operation under normal and adverse conditions. Currently, the practical energy density of current, state-of-the-art Li-ion batteries of only 200-300 Wh/kg, which is more than one order of magnitude lower than the energy density of coal, 6.7 kWh/kg, and approaching two orders of magnitude lower than commercial grade gasoline, ~12 kWh/kg. Even after factoring in the relatively low efficiency, ~18%, of the internal combustion (IC) engine, relative to an electric motor (typically >60%), it is apparent that fossil fuels provide substantially greater energy storage capacity than current batteries. This means that next generation Li-ion batteries capable of achieving operating energy densities in the transportation sector that are competitive with conventional fossil fuels will require substantial improvements in all components of current state-of-the art Li-ion technologies.

The electrolyte in a battery functions to shuttle ions between the electrodes. This component of lithium ion batteries has historically received less attention than the electrodes, because the demands on voltage, longevity, power, and safety in portable device applications are modest in comparison to applications in transportation, where much larger battery packs are demanded. Current state of the art liquid electrolytes in Li-ion batteries targeted for EVs and HEVs are in most cases simple transplants from Li-ion batteries used in low-voltage, low-power, portable devices. Optimized largely for the rate at which they transport ions, the volatility, flammability, and instability of currently used carbonate electrolytes have largely been overlooked. These efforts have instead been given to development of additives that react selectively to form conditioning films that limit reactivity of the electrolyte with the electrodes, and flame-retarding additives and containers which limit the severity and scale of fires produced when combustible electrolytes or components ignite.

Recent progress in synthesis and electrochemical analysis of room temperature ionic liquids (ILs) has established the promise of this unique class of materials as electrolytes for next-generation lithium batteries. Ionic liquids are organic salts having melting points below 100° C. and generally consist of a bulky cation and an inorganic anion. The large cation size allows for delocalization and screening of charges, resulting in a reduction in the lattice energy and thereby the melting point or glass transition temperature. Ionic liquids have negligible vapor pressure, non-flammability, good room-temperature ionic conductivity, wide electrochemical window, and favorable chemical and thermal stability, which make them an attractive option as an electrolyte for lithium batteries.

Despite the obvious promise, ionic liquid electrolytes suffer from two physical property limitations that to-date has made them unattractive for lithium battery applications. First, the fraction of the ionic conductivity of the electrolyte arising from mobile lithium ions (i.e. the so-called lithium transference numbers) are typically low for these materials, which makes cells assembled using IL electrolytes prone to polarization. Second, most ionic liquids exhibit low tensile and compressive strengths, which allows them to leak and spill, which limits the form factors an IL-based lithium battery can take.

SUMMARY

The present invention describes non-flammable, non-volatile, nano-hybrid electrolytes that overcome safety concerns in high energy lithium metal-based battery (LMBs) and high voltage Li-ion battery (LIB) configurations. The technology is based on innovative cross-linked polyionic liquid Poly(IL) that can form solid polymer electrolytes. Ionic-liquid tethered nano-particle hybrid materials are used to reinforce these films. The resultant ion-conducting electrolyte composite membranes simultaneously overcome the poor thermal and electrochemical stability and safety problems that have plagued lithium battery electrolytes for years. They provide a platform for engineering electrolytes with both chemical and mechanical tunability that expand the range of available battery form factors available for automotive applications as well as consumer electronics. Because of the intrinsic wide electrochemical stability windows of the cross-linked polyionic liquid Poly(IL) electrolytes, they can be used to significantly enhance the operational temperature range and safety of state of the art LIBs, emerging highvoltage LIBs, and high-energy rechargeable lithium-sulfur batteries (LMBs).

In one aspect, a composite electrolyte is provided and includes a polymeric ionic liquid matrix; and a plurality of functionalized nanoparticles embedded therein, wherein at least one cationic moiety selected from the group consisting of a nitrogen cation moiety, a phosphorus cation moiety, and a sulfur cation moiety is tethered to the nanoparticle.

In one or more embodiments, the nitrogen cation moiety is selected from the group consisting of imidazolium, ammonium, pyridinium, piperidinium and pyrrolidinium moieties.

In any of the above noted embodiments, the composite electrolyte further comprises a multifunctional crosslinking agent.

In any of the above noted embodiments, the crosslinking agent comprises a gemini ionic liquid moiety.

In one or more embodiments, the polymeric ionic liquid matrix comprises a polymer backbone and a plurality of pendant groups, and wherein a plurality of cation moieties are located in one or more of the pendant groups or the polymer backbone, the cationic moieties being at least one of a nitrogen cation moiety, a phosphorus cation moiety, and a sulfur cation moiety.

In any of the above noted embodiments, the crosslink of the crosslinking agent comprises at least one cationic moiety selected from the group consisting of a nitrogen cation moiety, a phosphorus cation moiety, and a sulfur cation moiety.

In one or more embodiments, the nitrogen cation moiety is selected from the group consisting of imidazolium, ammonium, pyridinium, piperidinium and pyrrolidinium moieties.

In any of the above noted embodiments, the composite further includes a lithium salt.

In any of the above noted embodiments, the composition further includes a non-polymerizable room temperature ionic liquid present in a range of 1% to 50% or 5% to 50% by weight.

In any of the above noted embodiments, the plurality of nanoparticles includes a metal oxide material selected from the group consisting of silica, alumina, ceria, titania, vanadia and zirconia metal oxide materials.

In any of the above noted embodiments, the functionalized nanoparticles are uniformly dispersed throughout the polymeric ionic liquid matrix.

In any of the above noted embodiments, the functionalized nanoparticles are covalently linked to the polymeric ionic liquid matrix.

In any of the above noted embodiments, the functionalized nanoparticles are present in the composite electrolyte in a range of 0.01% and 20% by weight.

In any of the above noted embodiments, the composite further includes an aprotic solvent.

In another aspect, an electrochemical cell, comprising positive and negative electrodes spaced apart from each other by the electrolyte electrolyte comprising a polymeric ionic liquid matrix; and a plurality of functionalized nanoparticles embedded therein, wherein at least one of a nitrogen cation moiety, a phosphorus cation moiety, and a sulfur cation moiety is tethered to the nanoparticle is described herein.

In another aspect, a method of making a composite electrolyte includes (1) forming a reaction mixture comprising: (i) a polymerizable monomer comprising at least one of a nitrogen cation moiety, a phosphorus cation moiety, and a sulfur cation moiety, (ii) a plurality of functionalized nanoparticles, wherein at least one of a nitrogen cation moiety, a phosphorus cation moiety, and a sulfur cation moiety is tethered to the nanoparticle; and (2) initiating polymerization in the reaction mixture to form a polymeric ionic liquid matrix, wherein the functionalized nanoparticles are embedded in the matrix.

In one or more embodiments, the polymerization is a free radical polymerization reaction.

In one or more embodiments, the reaction is initiated by heat, or by ultraviolet energy or by microwave energy.

In one or more embodiments, the method further includes adding an initiator in the reaction mixture.

In one or more embodiments, the method further comprises a multifunctional crosslinking agent in the reaction mixture.

In one or more embodiments, the multifunctional crosslinking agent comprises a Gemini ionic liquid moiety.

In one or more embodiments, the multifunctional crosslinking agent comprises at least one cationic moiety selected from the group consisting of a nitrogen cation moiety, phosphorus cation moiety, and sulfur cation moiety.

In one or more embodiments, the nitrogen cation moiety is selected from the group consisting of imidazolium, ammonium, pyridinium, piperidinium and pyrrolidinium moieties.

In one or more embodiments, the method further comprising an alkali metal salt in the reaction mixture.

In one or more embodiments, the polymerizable monomer comprising a styrenic or (meth)acryloyl, vinyl, allyl, acrylic or methacrylic moiety.

In one or more embodiments, the plurality of nanoparticles include a metal oxide material selected from the group consisting of silica, alumina, ceria, titania, vanadia and zirconia metal oxide materials.

In one or more embodiments, the nitrogen cation moiety is selected from the group consisting of imidazolium, ammonium, pyridinium, piperidinium, and pyrrolidinium nitrogen cation moieties.

These and other aspects and embodiments of the disclosure are illustrated and described below.

BRIEF DESCRIPTION OF THE DRAWINGS

The invention is described with reference to the following figures, which are presented for the purpose of illustration only and are not intended to be limiting.

In the Drawings.

DETAILED DESCRIPTION

Polymeric ionic liquids have been previously investigated for use as electrolytes. However, due to a decrease in the number of mobile ions and considerable elevation of Tg, the approach of polymerizing ionic liquid monomers was shown to significantly decrease the ionic conductivity. Tethering ILs to nanoparticles and crafting electrolytes based on suspensions of the tethered-ILs in a polymeric electrolyte host, provides a potential solution to these challenges and also provides a path towards IL-based electrolytes with higher lithium transference numbers and improved stability. Composite Cross-Linked Poly Ionic Liquid (Poly(IL)) Electrolytes.

Poly (ILs) are a class of functional polymers useful in a variety of applications. The repeating units of these polymers bear an electrolyte group (cation or anion). Ionic conductivity of the Poly(ILs) depends on several factors: chemical nature of polymer back bone, nature of ions and glass transition temperature (Tg). Apart from high ionic conductivity and high thermal stability, poly (ILs) offer high Li ion transference number. The high Li transference number is a consequence of the cation immobilized to the polymer backbone and thereby not participating in the ionic conduction. For energy storage applications, film type, e.g., solid polymer, ion conductive materials are preferred over liquid electrolytes. Polymerizable groups can be easily appended to the ionic liquid constituents. As compared to liquid electrolytes, they are lighter in weight and are more easily processed, treated and packaged.

Figure 1:
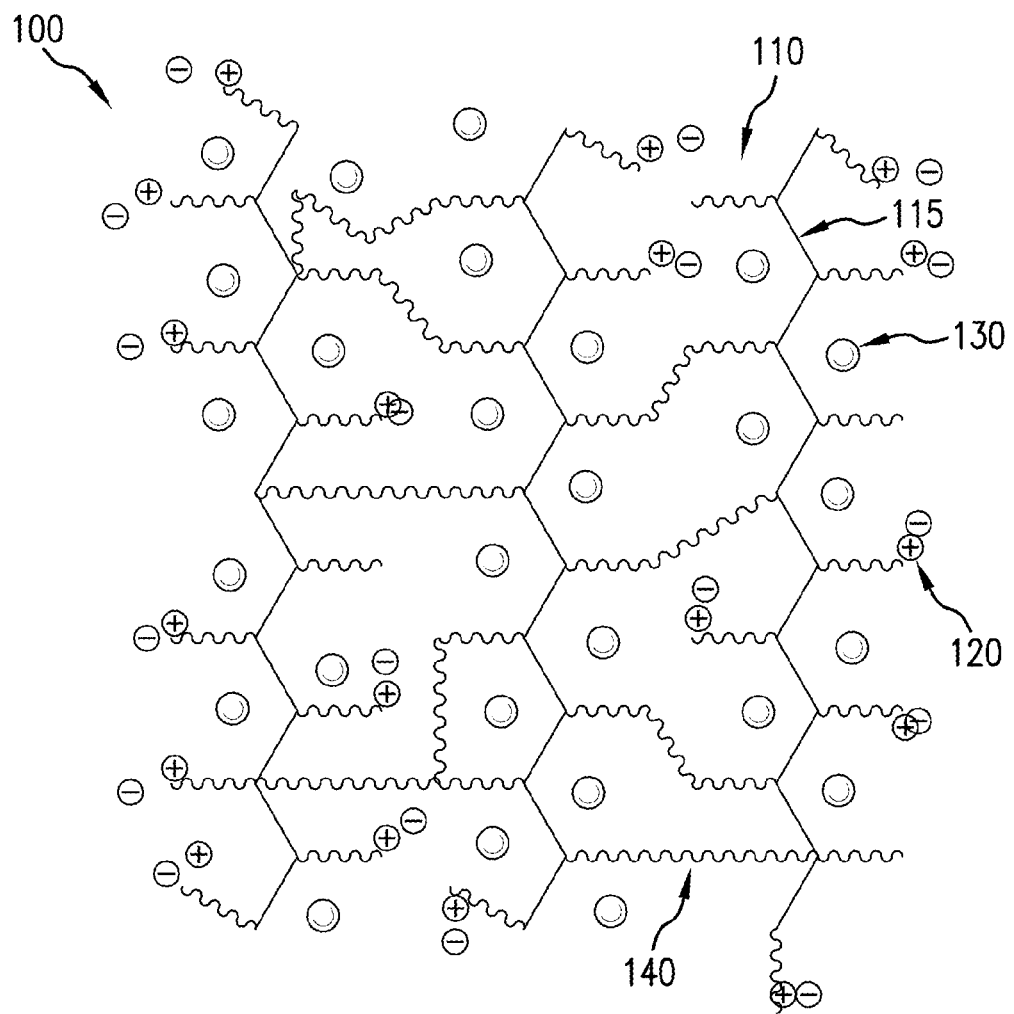
FIG. 1 is a schematic representation of a composite ionic liquid-tethered nanoparticle/polymeric ionic liquid according to one or more embodiments.
Figure 2:
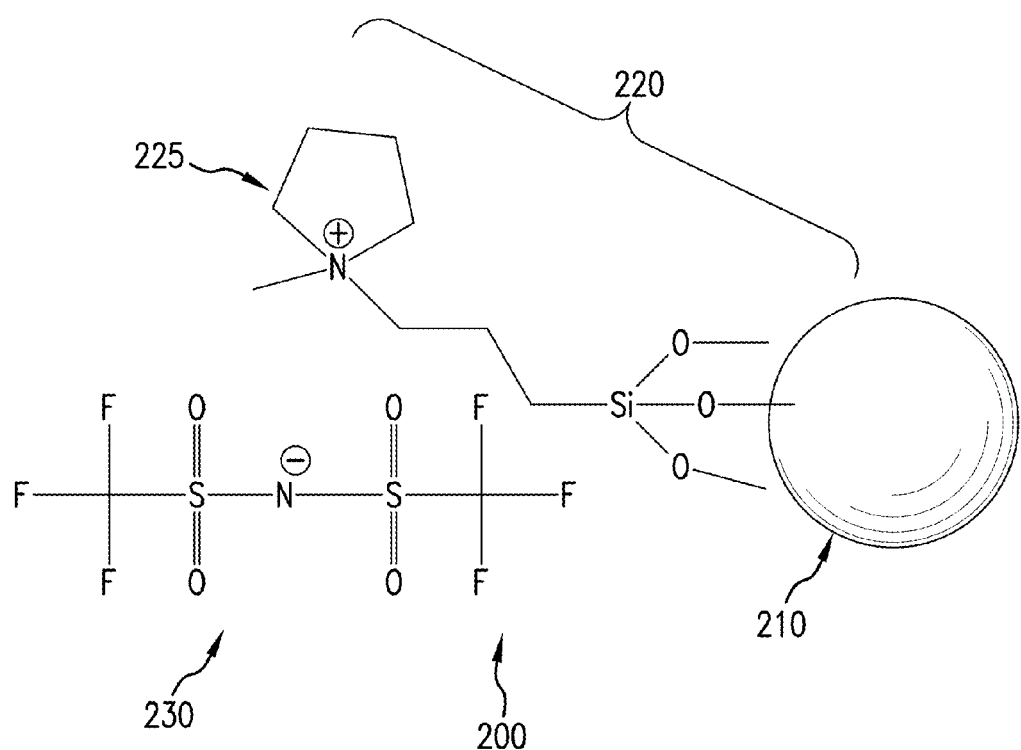
FIG. 2 is a schematic representation of an ionic liquid-tethered nanoparticle according to one or more embodiments.

According to one embodiment, an electrolyte for a lithium ion battery having improved ionic conductivity and mechanical stability is described with reference to FIG. 1. The electrolyte includes a poly (ionic liquid) composite material 100 (that can be cast or formed into a variety of shapes such as films, membranes and blocks) comprising ionic liquid (IL)-tethered nanoparticles 130 incorporated into a polymeric ionic liquid (PIL) 110, alternatively referred to herein as a poly(ionic liquid) or poly(IL). The polymeric ionic liquid is formed from the crosslinking of polymerizable ion liquid monomers and includes a backbone 115 (that optionally can include ionic liquid moieties) and pendant ionic liquid groups 120 (shown as paired positively and negatively charged particles). The ionic liquid polymer composite includes a bifunctional ionic liquid crosslink 140 (e.g., a crosslinkable gemini ionic liquid) that provide mechanical stability to the film and that further assists the ionic conductivity of the composite. An exemplary tethered-IL nanoparticle 200 is shown in FIG. 2. As illustrated in FIG. 2, an IL-tethered nanoparticles includes (1) a nanoparticle 210; and (2) an ionic liquid molecule 220 comprising: (a) at least one of a nitrogen cation moiety, a phosphorus cation moiety and a sulfur cation moiety 225 tethered to the nanoparticle; and (b) a counter anion 230 associated with the at least one of the nitrogen cation moiety, the phosphorus cation moiety and the sulfur cation moiety and charge balancing the at least one of the nitrogen cation moiety, the phosphorus cation moiety and the sulfur cation moiety. Tethered-IL nanoparticles are discussed in further detail herein below. In this embodiment, the IL-tethered nanoparticles are dispersed throughout the poly ionic matrix. In preferred embodiments, the tethered IL nanoparticles are homogeneously distributed throughout the polymer matrix to contribute to both uniform ionic conductivity and mechanical reinforcement.

Figure 3:
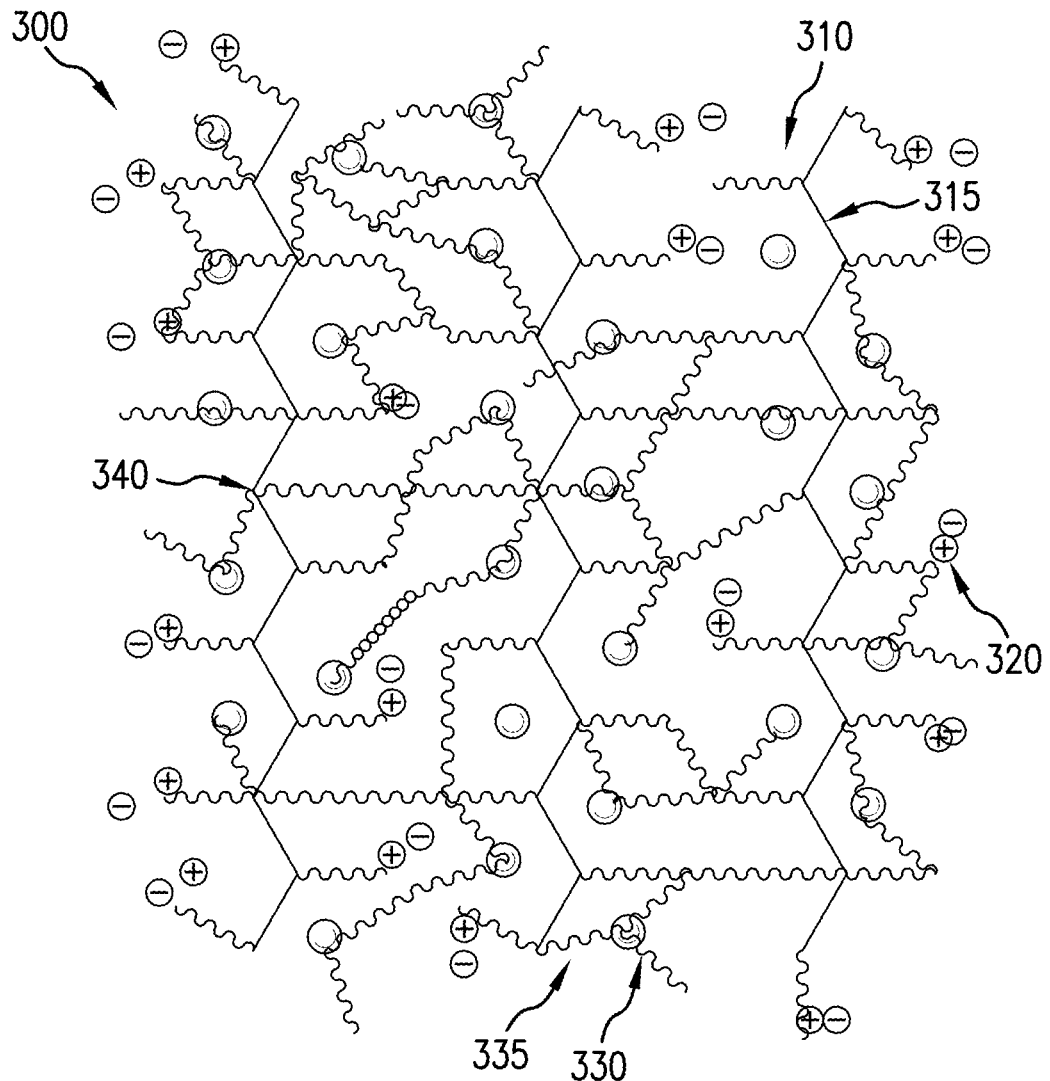
FIG. 3 is 1 is a schematic representation of a composite ionic liquid-tethered nanoparticle/polymeric ionic liquid according to one or more embodiments.

According to another embodiment, an electrolyte for a lithium ion battery having improved ionic conductivity and mechanical stability is described with reference to FIG. 3, in which the tethered-IL nanoparticles are further linked and immobilized on the ionic liquid polymer matrix. The electrolyte includes a poly (ionic liquid) composite material 300 (that can be cast or formed into a variety of shapes such as films, membranes and blocks) comprising ionic liquid (IL)-tethered nanoparticles 330 chemically crosslinked onto a polymeric ionic liquid (PIL) 310. The polymeric ionic liquid is formed from the crosslinking of polymerizable ion liquid monomers and includes a backbone 315 (that optionally can include ionic liquid moieties) and pendant ionic liquid groups 320 (shown as paired positively and negatively charged particles). The ionic liquid polymer composite includes a bifunctional ionic liquid crosslink 340 (e.g., a crosslinkable gemini ionic liquid) that provide mechanical stability to the film and that further assists the ionic conductivity of the composite. The tethered-IL nanoparticle forms a chemical bridge to the polymeric ionic liquid (PIL) 310 through linkers 335.

An ionic liquid based hybrid composite polymer electrolytes that exhibit high ionic conductivity, wide electrochemical stability and high thermal stability for applications in EVs or PHEVs is disclosed. The ionic liquid based hybrid composite polymer electrolytes includes Li-ion conducting membranes from poly (ionic liquids) and ionic liquid tethered nano-particle composites. These electrolytes can be incorporated into Li-metal batteries (Li-Sulfur) and high voltage cathodes (mixed metal oxides and phosphates).

The vast range of anion and cation chemistries that can be combined to create ILs tailor-made or explicitly designed to complement a specific combination of electrode chemistries, also provides a largely untapped materials library that can address concerns about battery safety.

Preparation of Composite Cross-Linked Poly(IL) Electrolytes.

Composite cross-linked poly ionic liquid electrolytes are assembled by polymerization of suitable ionic liquid monomers and, optionally, ionic liquid crosslinkers, in the presence of a tethered-ionic liquid nanoparticle. The resultant composite includes reinforcing particles embedded in a polymeric ionic liquid. Polymeric ionic liquids can be formed using polymerizable ionic liquids such as vinyl functionalized ionic liquids. Such monomers can be polymerized using conventional free radical or UV-initiated polymerization.

Ionic Liquid Monomers

Figure 4A:
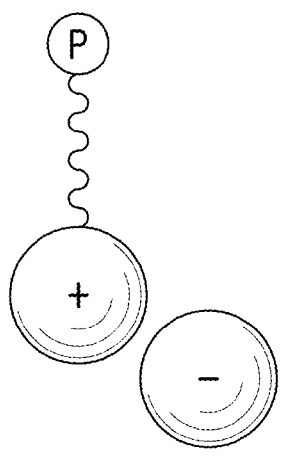
FIG. 4A-4C are schematic representations of exemplary ionic liquid monomers according to one or more embodiments.
Figure 4B:
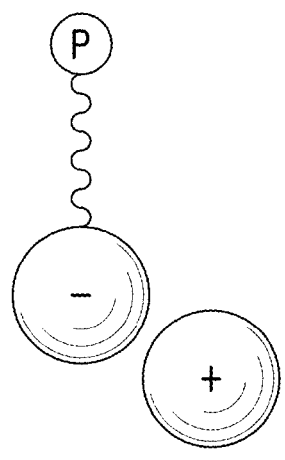
Figure 4C:
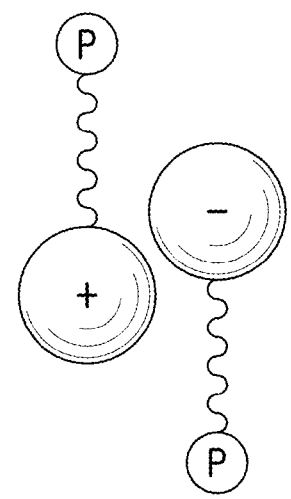

An ionic liquid monomer is an ionic liquid in which one or more polymerizable units are incorporated. FIG. 4 represents a basic form of ionic liquid monomers suitable for use according to one or more embodiments. In an ionic liquid monomer, the polymerizable feature can be located on the cation (FIG. 4A) or on the anion (FIG. 4B) or both the cation and the anion (FIG. 4C).

Exemplary ionic liquid monomers include a nitrogen cation moiety having a nitrogen cation selected from the group including but not limited to an imidazolium, ammonium, pyridinium, piperidinium and pyrrolidinium nitrogen cation moieties. These groups can be functionalized with side groups that are capable of polymeriziation. Exemplary polymerizable groups include vinyl groups such as styrenic or (meth)acryloyl groups. The vinyl groups are capable of free radical, ultra-violet or microwave initiated polymerization, thereby incorporating the pending ionic liquid into the polymer.

In one embodiment, the ionic liquid monomer forms a styrenic backbone, e.g., repeating vinyl benzylic unit, with an appropriate pendant ionic liquid, such as shown by compound 1.

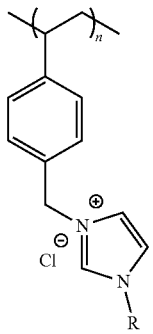

1

Exemplary styrenic-based ionic polymers include poly([1-(p-vinylbenzyl)-3-butylimidazolium tetrafluoroborate] 1a, poly([1-(p-vinylbenzyl)-3-butylimidazoliumtetrachloroferrate] 1b, poly([1-(p-vinylbenzyl)-3-butylimidazoliumbenzoicsulphimide] 1c, and poly([1-(p-vinylbenzyl trimethylammonium tetrafluoroborate] 1d.

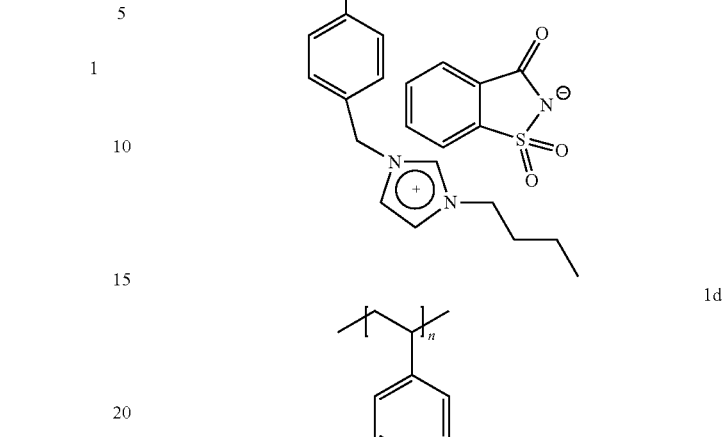

1a

1b

1c

1d

Reproduced from Tang et al., (2008) *Macromolecules*, 41, 2, 493-496 (2008).

In other embodiments, the ionic liquid monomer is a (meth)acryloyl derivative, such as exemplified by structure 2.

2

Variations using other known ionic liquids, including for example, ammonium, pyridinium, piperidinium and pyrrolidinium nitrogen cation moieties, as well as phosphonium and sulfonium cation moieties can also be used.

Figure 5:
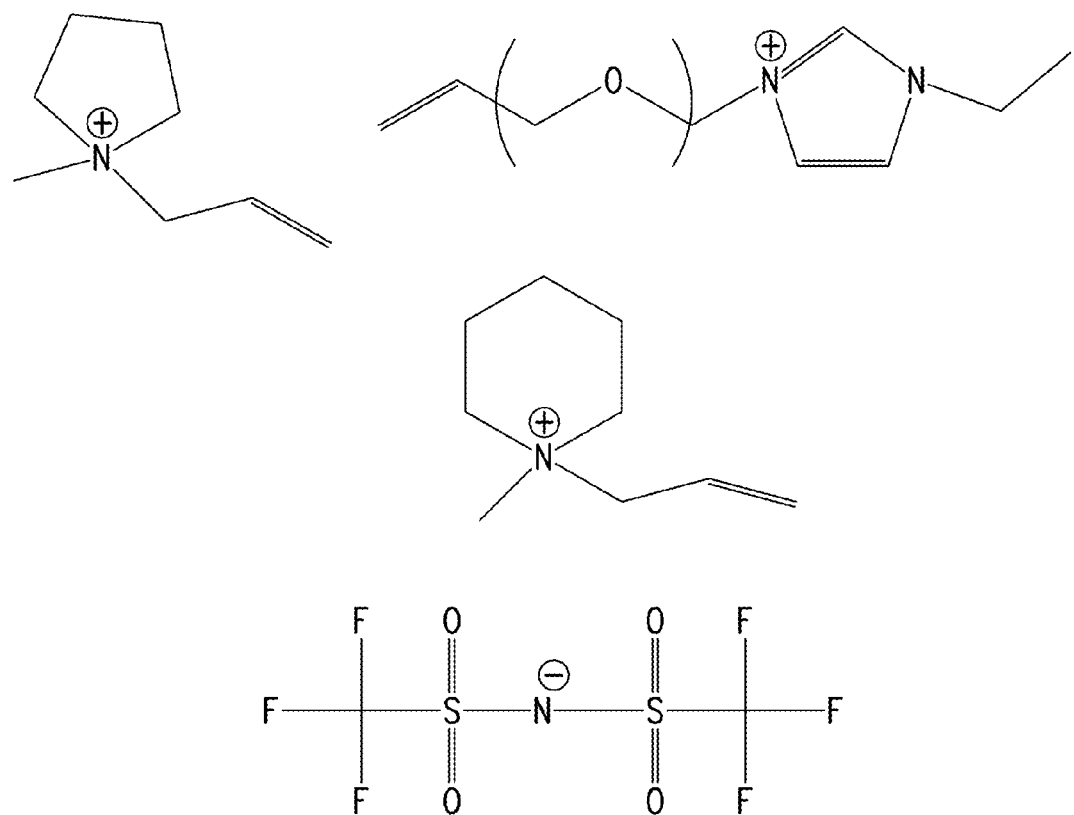
FIG. 5 are monomeric ionic liquids for use in the composite crosslinked polyionic liquid electrolytes according to one or more embodiment.

In one or more embodiments, a family of vinyl functionalized polymerizable imidazolium (Im), pyrrolidinium (Pyr) and piperidinium (Pip) cation based monomer ILs are suitable for use as ionic polymer monomers. Structures of these monomers are shown in FIG. 5. Vinyl monomer ionic liquids having bis(trifluoromethylsulfonyl)imide (TFSI) as counter ion can be synthesized by reacting vinyl functionalized cations, Im, Pyr and Pip with alkyl halides, e.g. at a 1:2 mole ratio, at 60° C. in presence of copper for 72 hr. After the quaterinazation reaction, that halide salt can be extracted with ethyl ether. The bis(trifluoromethylsulfonyl)imide (TFSI) anion is exchanged with bromide containing salt using Li salt in water. Unreacted monomer IL can be separated from water and dried in a vacuum oven to remove any traces of water.

Further information regarding the polymerization of ionic liquid monomers can be found at J. Yaun and M. Antonietti, "Poly(ionic liquid)s: Polymers Expanding Classical Property Profiles" Polymer, 52 (2011) 1469-1482; A. S. Shaplov, E. Lozinskaya, Y. S. Vygodskii, "Polymer ionic liquids (PILs): synthesis, design and application in electrochemistry as ion conducting materials" in *Electrochemical properties and applications of ionic liquids*, A. A. J, Torriero, M. Shiddiky, ed.; New York: Nova Science Publishers Inc; p. 203-98. 2010; and D. Mecerreyes, "Polymeric ionic liquids: Broadening the properties and applications of poly electrolytes", *Prog Poly Sci*, 36 (2011) 1629, which are incorporated by reference in their entirety.

Figure 6:
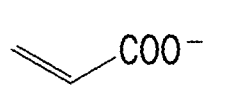
FIG. 6 is a schematic representation of polymerizable anions according to one or more embodiments.
Figure 6:
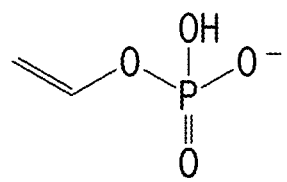
Figure 6:
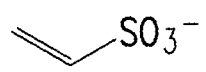
Figure 6:
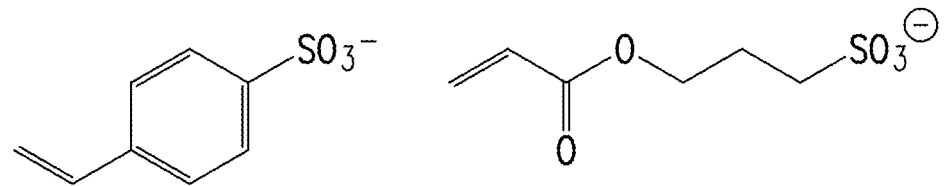

In other embodiments, the polymerizable group can be included in the anionic group. For example, an IL monomer can include a vinyl polymerizable moiety, such as vinyl carbonates, vinyl sulfites and sulfates, and vinyl phosphates. Exemplary polymerizable anions are shown in FIG. 6. In one non-limiting example, an acrylate-type anion, such as compound 3, is used as the polymerizable IL monomer.

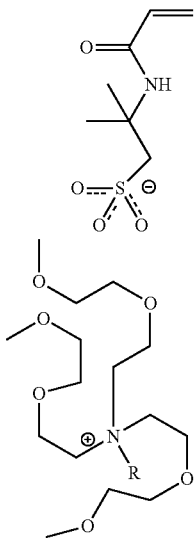

3

Monomer weight percentage ranges from 20 to 70% compared to nanoparticles. Nanoparticle loading is relatively low (0.1 to 20 wt %), preferably 3 wt %.

Crosslinkers

The composite electrolyte also includes a crosslinker that crosslinks with the ionic liquid monomer and helps improve mechanical strength. Cross linkers play a role in dictating the flexibility of the membrane. The crosslinker can be a conventional bifunctional molecule or it can itself be an ionic liquid. The bifunctional nature of the crosslinker create bridges between polymer chains; however, the crosslinker can also be incorporated into a growing polymer chain. Conventional crosslinkers include moieties having two or more vinyl features, such as divinyl benzene, dimethacrylates and diacrylates.

Figure 7:
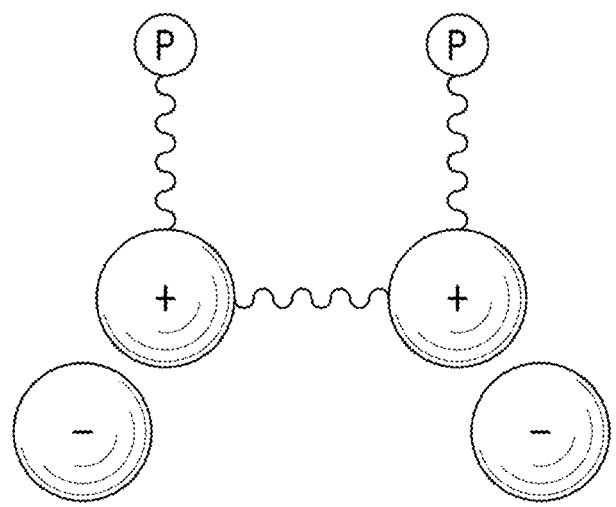
FIG. 7 is a schematic representation of an exemplary crosslinkable gemini ionic liquid according to one or more embodiments.
Figure 8A:
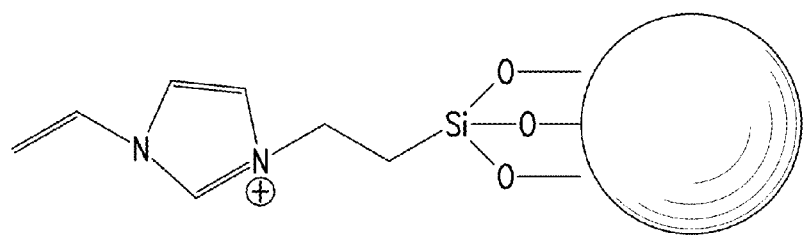
FIG. 8A-8D are schematic illustrations of tethered ionic liquid nanoparticles having polymerizable features according to one or more embodiments.
Figure 8B:
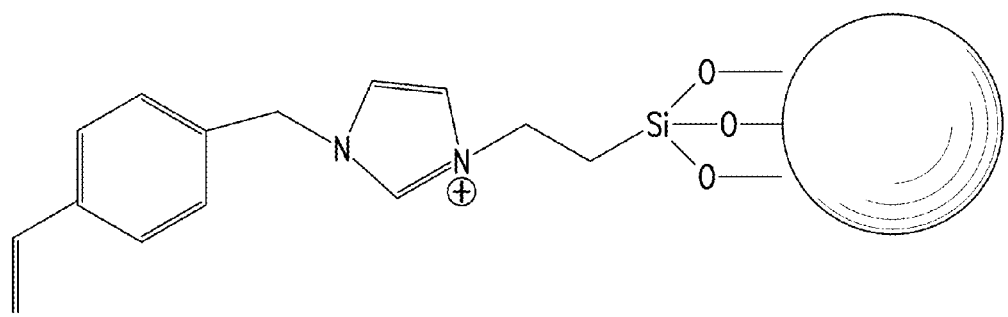
Figure 8C:
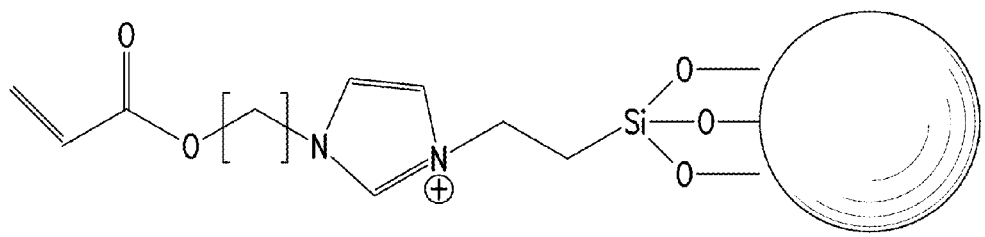
Figure 8D:
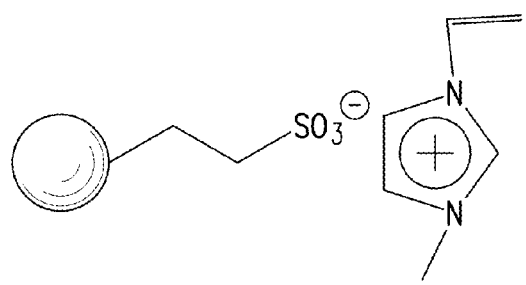

Gemini ionic liquids are molecules in which two ionic liquid moieties are joined by a linking group to form a bifunctional molecule. When each of the ionic liquid moieties are further functionalized to include a polymerizable unit, the gemini ionic liquids can function as a crosslinking agent. FIG. 7 represents a basic form of crosslinkable gemini ionic liquids suitable for use according to one or more embodiments in which a polymerizable feature is located on each of the cation moieties. In reacting with the ionic liquid monomers, the crosslinking ionic liquid can form a bridge between two polymeric backbones, or it can become incorporated into the polymeric backbone, thereby increasing the ion conductivity of the polymer itself.

Different bifunctional gemini ionic liquid cross linkers with varying functional groups such as vinyl, vinyl benzene, and acrylate can be used to obtain a polymer membrane having the desired mechanical properties. Exemplary crosslinkers include, but are not limited to, the following:
Ethylene glycol diacrylate (EGDA)
Divinylbenzene (DVB)
Trimethylolpropane trimethacrylate (EMPTMA)
Triethylene glycol dimethacrylate (TEGDMA)
Poly(ethylene glycol) dimethacrylate (PEGDMA 550).
Other suitable crosslinkers are known in the art.

Glass transition temperature is the key property to tune the ionic conductivity of the poly(ILs). Hence, the structure of the cross linking agent can be selected to increase flexibility of the membrane for maximizing the ionic nature.

Tethered Ionic Liquids

According to one or more embodiments, the ion conductive polymer membranes include IL-tethered nanoparticles incorporated as colloidally stable fillers in a cross-linked polyionic liquid Poly(IL) electrolyte. As illustrated in FIG. 2, an IL-tethered nanoparticles includes (1) a nanoparticle; and (2) an ionic liquid molecule comprising: (a) at least one of a nitrogen cation moiety, a phosphorus cation moiety and a sulfur cation moiety tethered to the nanoparticle; and (b) a counter anion associated with the at least one of the nitrogen cation moiety, the phosphorus cation moiety and the sulfur cation moiety and charge balancing the at least one of the nitrogen cation moiety, the phosphorus cation moiety and the sulfur cation moiety. Although FIG. 2 illustrates a single ionic liquid molecule including a nitrogen cation moiety tethered to a single nanoparticle through a condensed alkoxysilane linkage, and while the embodiments contemplate that a particular cation moiety within each ionic liquid molecule is tethered to only a single nanoparticle, each nanoparticle may have tethered thereto more than one cation moiety within more than one ionic liquid molecule and generally from about 10 to about 1000 cation moieties within about 10 to about 1000 ionic liquid molecules, and more preferably from about 50 to about 500 cation moieties within about 50 to about 500 ionic liquid molecules.

With respect to the nanoparticle, the nanoparticle may comprise a dielectric nanoparticle material and in particular a metal oxide dielectric nanoparticle material. Particular examples of metal oxide dielectric nanoparticle materials that may be used for fabricating a nanoparticle in accordance with the embodiments include, but are not limited to silica, alumina, ceria, titania, vanadia, and zirconia dielectric metal oxide materials. The embodiments also contemplate nanoparticles that comprise mixed metal oxide dielectric metal oxide nanoparticle materials. Typically and preferably, the nanoparticle in accordance with the embodiments has a size range from about 2 to about 1000 nanometers, and more preferably from about 10 to about 50 nanometers.

With respect to the nitrogen cation moiety within the ionic liquid material, the nitrogen cation moiety may comprise a nitrogen cation selected from the group including but not limited to an imidazolium, ammonium, pyridinium, piperidinium and pyrrolidinium nitrogen cation moieties. The embodiments also contemplate that phosphorus containing cation moieties such as but not limited to phosphonium cation moieties (and related nitrogen correlating phosphorus cation moieties) and sulfur containing cation moieties such as but not limited to sulfonium cation moieties (and related nitrogen correlating sulfur cation moieties), may also be tethered within the context of ionic liquids in accordance with the embodiments. In some embodiments, the ionic liquid may contain an organic cation and inorganic/organic anion, with the organic cation selected from a family of N-alkyl-N-alkyl-pyrrolidinium, N-alkyl-N-alkyl-pyridinium, N-alkyl-N-alkyl-imidazolium, N-alkyl-N-alkyl-phosphonium, N-alkyl-N-alkyl-sulfonium, N-alkyl-N-alkyl-ammonium, and N-alkyl-N-alkyl-piperidinium, and the anion selected from group of tetrafluoroborate, hexafluorophosphate, bis(trifluoromethylsulfonyl)imide, bis(pentafluoroethylsulfonyl)imide, and trifluoroacetate.

With respect to the linkage used to connect the ionic liquid to the nanoparticle, the tether can include a functional moiety to join the ionic liquid moiety to the metal oxide nanoparticle. Metal oxides typically include reactive oxygen surfaces, e.g., OH moieties, so that oxysilanes and acyl moieties can be used. The nanoparticle reactive linking moiety, e.g., oxysilane and acyl functionalities, can be joined to the ionic liquid through a flexible and non-reactive tether. The tether length can vary depending on the desired degree of flexibility. In certain embodiments, the tether is an alkyl C—C chain of length between 2 and 16 carbon atoms. In another embodiment, the tether consists of between 1 to 10 ethylene oxide repeat units. Further detail regarding the synthesis and use of IL tethered nanoparticles can be found in WO 2013/009731, entitled "Ionic-Liquid Nanoscale Ionic Material (Il-Nim) Compositions, Methods And Applications," and in WO 2010/083041, entitled "Nanoparticle Organic Hybrid Materials (NOHMS)", both of which are incorporated in their entireties herein by reference.

In other embodiments, the tethered ionic liquid can include a polymerizable moiety that can be used to link it to the polymer ionic liquid. Suitable polymerizable moieties are similar to those used for the monomeric ionic liquid such as vinyl functionalized ionic liquids. FIG. 8 is a schematic illustration of tethered ionic liquid nanoparticles having vinyl (A), styrenic (B) and acrylate (C) moieties bound to the cationic ionic liquid. It is also contemplated that the polymerizable moiety is bound to the counter anion of the ionic liquid (D).

The brush like configuration (hard nanocore with hundreds of pendant ILs per particle) of the IL-functionalization not only appears to facilitate uniform dispersion of nanoparticles in the host, but also allows the mechanical properties to be increased without compromising ionic conductivity. The particles impart electrochemical stability to the materials via multiple, possibly synergistic mechanisms, for example, by acting as a reservoir of anions, which can decrease the space charge theorized in the model of Chazalviel [C. Bris sot, M. Rosso, J-N. Chazaviel, S. Lascaud, "Dendritic growth mechanisms in lithium polymer cells", *J Power Sources*, 81-82, 925, 1999; J-N, Chazaviel, *Phys. Rev. A*, 42, 7355, 1990.], by reducing anion inhomogeneities in the electrolyte; and by creating a population of ionically bound counter ions near the anode, which reduce the destabilizing effects of polarization; and through creation of a particle-fortified boundary layer at the electrode, which reduces the strength of potential gradients—and the size of electric fields—the polarizable electrolyte molecules experience at the electrode/electrolyte interface.

Figure 9:
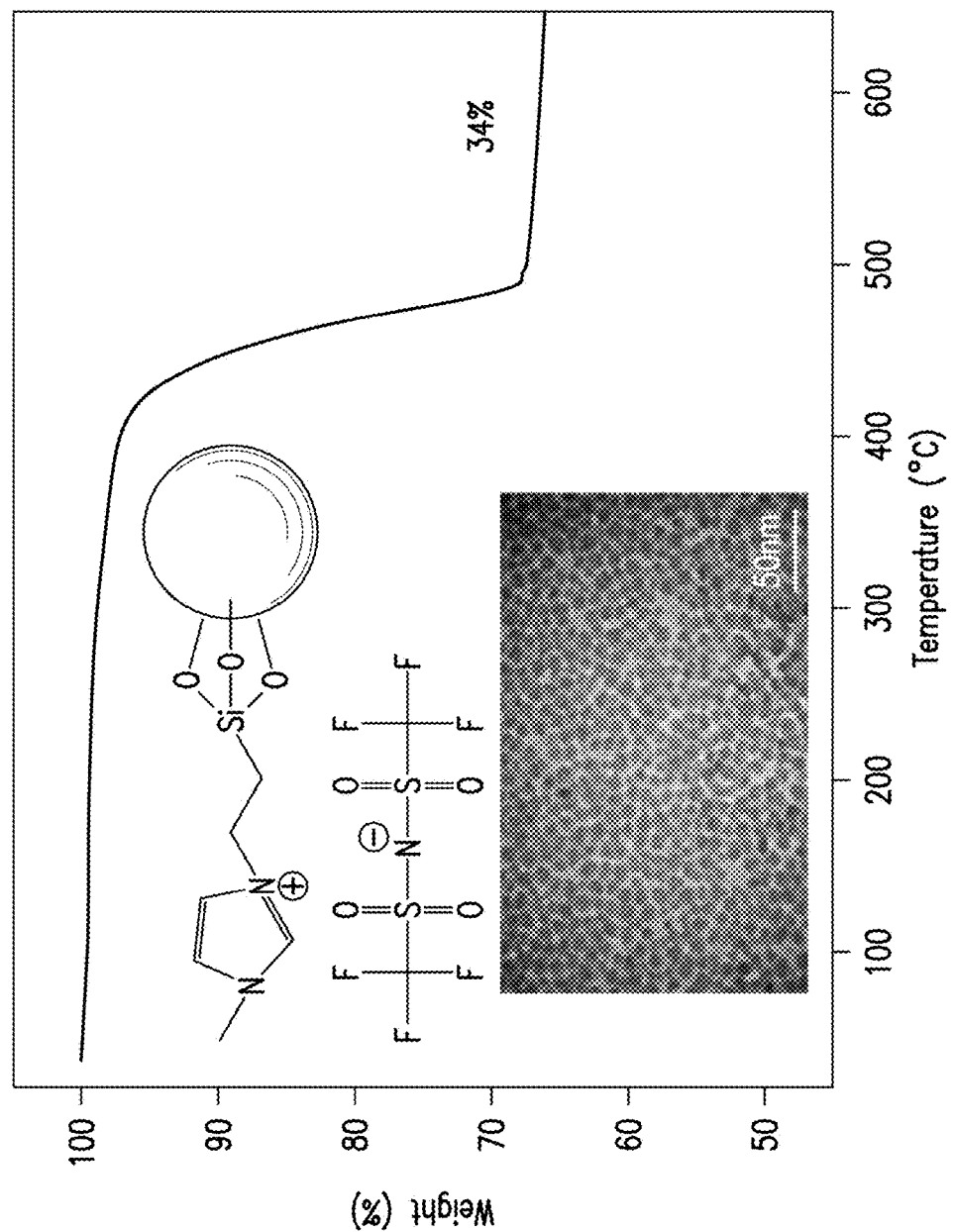
FIG. 9 is a TGA curve showing high thermal stability of IL-tethered nano-particles; the grafting density of ~1 IL molecules per $nm^2$ on was estimated from thermogravimetic analysis.

As illustrated in FIG. 9, the IL-tethered nanoparticles show exceptional, high thermal stability (400° C.) and, transmission electron microscopy (TEM) shows that even normally sticky 5 nm $SiO_2$ nanoparticles densely functionalized with the ILs are colloidally stable and not prone to aggregate. It is significant that the IL-tethered nanoparticles are well dispersed with regular particular spacing as this opens up numerous opportunities for producing IL-based electrolytes that allow explicit control of mechanical, thermal, and electrochemical properties for lithium battery applications.

In certain embodiments, the functionalized nanoparticles are present in the composite electrolyte in a range of 0.01% and 20% by weight. The addition of nanoparticles provides a positive correlation between mechanical properties and vol./wt content of nanoparticle. The materials exhibit attractive room-temperature ionic conductivities, e.g., $10^{-4}$-$10^{-2}$ $S/cm^2$, at all particle loadings between $\phi=0$ to 0.55.

Additional Components.

Additional components may also be included in the composite electrolyte. For example, non-polymerizable ("free") ionic liquids can be includes in an amount up to 55% by weight and in particular in the range of 5% to 55% by weight. Initiators can be included to assist in polymerization. Initiation can be from any of photoinitiation (e.g. 2-hydroxy-2-methylpropiophenone), microwave initiation, sonication initiation, electrolytic initiation, or temperature initiation (e.g. azobisisobutyronitrile). In other embodiments, a conventional lithium ion salt can be included in the electrolyte to further increase ionic conductivity. Exemplary lithium salts include $LiClO_4$, $LiPF_6$, $LiBF_4$; and fluorine-containing organic lithium salts such as $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$. These salts may be used singly or in combination of two or more salts. Non-aqueous electrolyte can also be added to the electrolyte composition, and may include cyclic carbonates such as ethylene carbonate, propylene carbonate and butylene carbonate; chain carbonates such as dimethyl carbonate, diethyl carbonate and ethyl methyl carbonate; cyclic esters such as γ-butyrolactone and γ-valerolactone; chain esters such as methyl acetate and methyl propionate; cyclic ethers such as tetrahydrofuran, 2-methyl tetrahydrofuran and tetrahydropyran; chain ethers such as dimethoxyethane and dimethoxymethane; cyclic phosphoric acid esters such as ethylene methyl phosphate and ethyl ethylene phosphate; chain phosphoric acid esters such as trimethyl phosphate and triethyl phosphate; halides thereof; sulfur-containing organic solvents, Vinyl ethylene carbonate (VEC) and Fluoroethylenecarbonate (FEC), Poly (ethylene glycol) diacrylate.

Electrolyte Compositions

The crosslinked polyionic liquid electrolyte can be combined with suitable electrolyte salts in order to obtain a polymer electrolyte membrane with high ionic conductivity.

In some embodiments, a hybrid electrolyte consists of a crosslinked polyionic liquid electrolyte including an ionic liquid-tethered nanoparticle), a lithium salt, and (optionally) an aprotic solvents. The lithium salt may be $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)_2$, $LiC_2F_5SO_3$, $LiN(C_2F_5SO_2)_2$, $LiB(C_2F_5SO_2)_2$, $LiClO_4$, $LiBF_4$, $LiI$, $LiSCN$, $LiNO_3$, $LiPF_6$, $LiAsF_6$, $NaC_2F_5SO_3$, $NaPF_6$, $NaClO_4$, $NaBF_4$, $NaI$, $NaSCN$, $NaNO_3$, $NaAsF_6$, $KC_2F_5SO_3$, $KPF_6$, $KC_1O_4$, $KBF_4$, $KI$, $KSCN$, $KNO_3$, $KAsF_6$, $Mg(ClO_4)_2$, $Mg(BF_4)_2$, Lithium bis(trifluoromethylsulfonyl)imide (LiTFSI), Lithium bis (pentafluoroethylsulfonyl)imide, and Lithium trifluoroacetate. The aprotic solvent may be selected from the group consisting of carbonates, ethers, acetamides, acetontrile, symmetric sulfones, 1,3-dioxolanes, dimethoxyethanes, glymes, siloxanes and their blends.

Manufacturing Scheme

Figure 10:
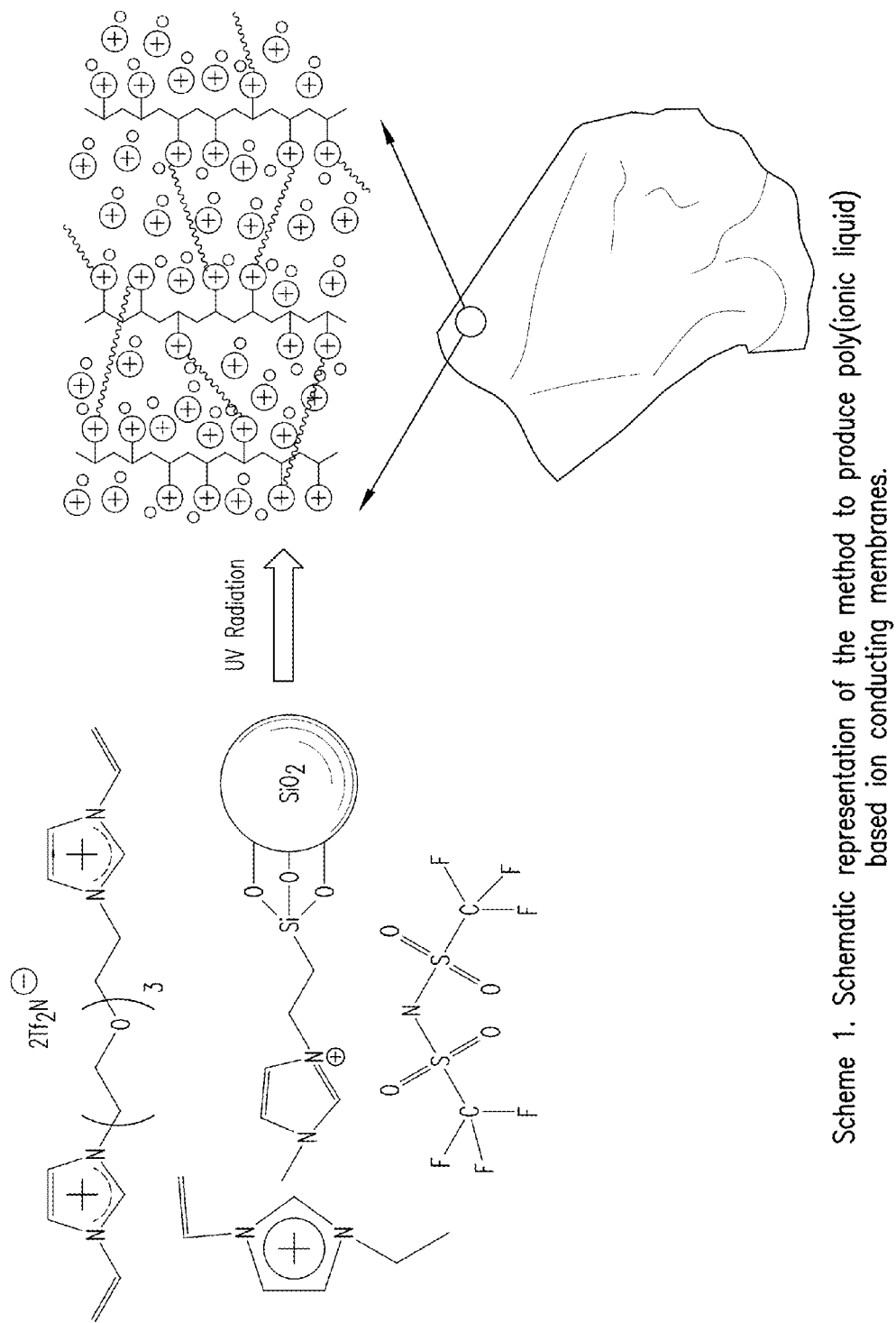
FIG. 10 is a schematic representation of a method for producing a composite ionic liquid-tethered nanoparticle/polymeric ionic liquid according to one or more embodiments.

Polymerized ionic liquids can be synthesized by direct polymerization of the ionic liquid monomers that have been functionalized with a polymerization unit or by chemical modification (to incorporate the ionic liquid) of existing polymers. In one or more embodiments, a scalable UV radiation-based polymerization technique is described to create mechanically and thermally stable ion conductive membranes from cross linkable gemini ionic liquids, monofunctional IL monomers and IL-tethered nanoparticle filler. One realization of the approach is depicted in Scheme 1, shown in FIG. 10, where a cross-linker, monomer IL and IL-functionalized nanoparticles are premixed.

Figure 11:
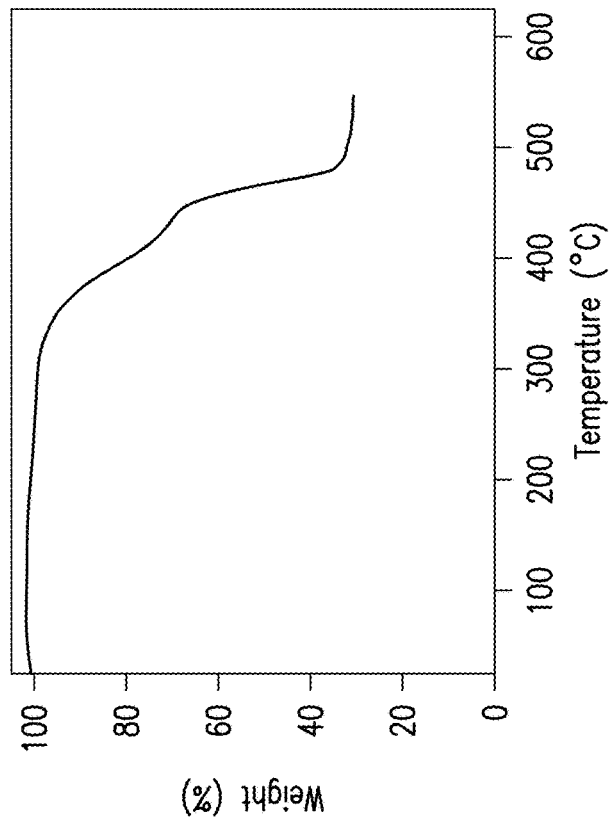
FIG. 11 is a plot showing thermal stability of Poly (IL) membranes and ionic conductivities at different temperatures soaked with pure IL electrolytes.
Figure 11:
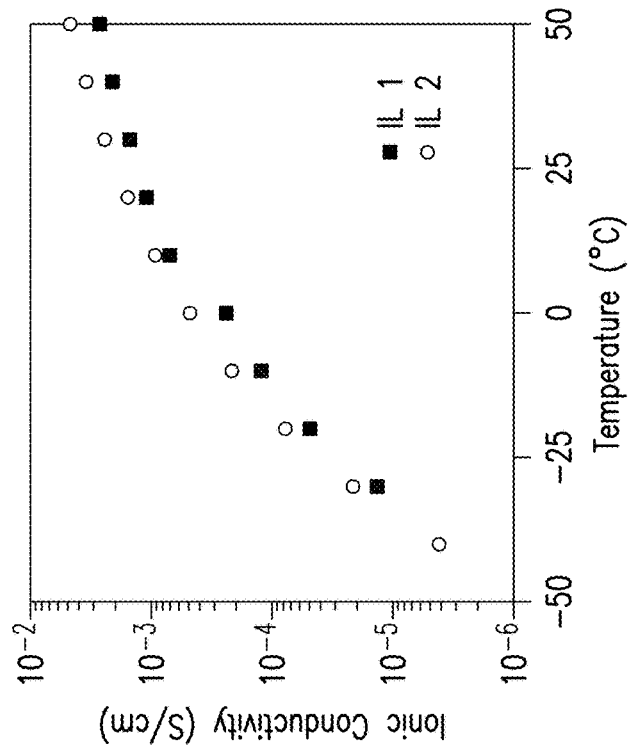
Figure 12:
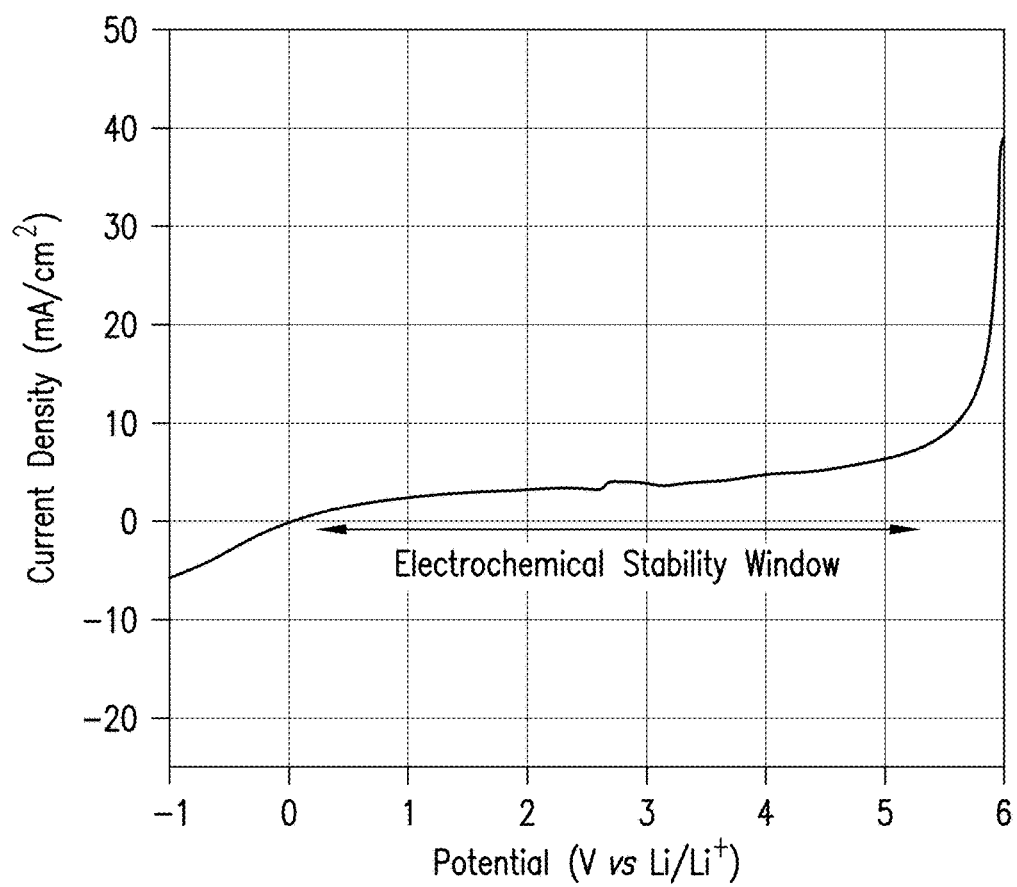
FIG. 12 is a plot of Poly(IL) membranes doped with EC/DEC 1MLiPF$_6$ electrolyte showing high electrochemical stability against Li metal.

Subjecting the materials to UV radiation produced freestanding covalently-linked polymer films with a uniform distribution of IL functionalized nanoparticles. Due to random crosslinking of IL moieties and uniformly distributed IL-tethered nanoparticles, the resultant polymer films are mechanically stable and tough. Also, because of the high dielectric constant of ILs, these membranes are effective in dissociating lithium salts. Thermal stability of the poly IL films was measured using thermal gravimetric analysis (TGA). As shown in FIG. 6, these films are stable up to at least 400° C. Ionic conductivities of the poly(IL) films soaked with pure IL electrolytes at different temperatures were measured using a dielectric spectrometer with temperature control system. As also depicted in FIG. 11, conductivity values comparable to pure IL liquid electrolytes are obtained for membranes that are essentially solid films. The as prepared poly(IL) membranes exhibited wide electrochemical stability against Li-metal anode. FIG. 12 shows a linear scan voltammogram of poly(IL) membranes soaked with state of the art LIB electrolyte (EC:DEC containing 1M LiPF$_6$ from Merck). The ability to tune the membrane surface groups facilitates high degrees of freedom to create these novel thermal and electrochemically stable membrane electrolytes for high voltage LIB applications.

In one or more embodiments, the polymer electrolyte is prepared as a film or membrane. In one or more embodiments, polymer electrolyte membranes can be made in a continuous process, for example roll to roll processing or extrusion. In another embodiment, polymer electrolyte membranes can be made in a batch process such as hot pressing or solvent based casting. Additionally, post-polymerization stretching, heating, gelling, or other treatments may be used to improve the mechanical or electrochemical properties of the films.

Poly(IL) electrolyte take advantage of the exceptional mechanical strength and toughness of the Poly(IL) membranes, the inherently wide electrochemical stability windows and thermal stability derived from the IL components, to develop and commercialize separator/electrolyte films that promise to revolutionize safety of lithium batteries. Analogous to porous media with tunable pore chemistry, dimensions, tortuosities, and surface chemistry these membranes provide numerous opportunities for tuning physical and electrochemistry for specific battery applications (e.g. by changing the particle and/or IL ligand chemistry, size, grafting density, and chemistry of the polymeric network). Further, by taking advantage of the already large libraries of available ionic liquid chemistries, the new poly (IL) membranes open up a new vista for engineering novel hybrid electrolytes in configurations optimized for drop-in replacement of current separators/liquid electrolyte pairs used worldwide in commercial battery manufacturing.

Characterization of Poly(IL) Membranes

A successful membrane electrolyte/separator for the Li-ion battery desirably possesses at least four characteristics: (i) it is an electronic insulator; (ii) it can be wetted and its pores easily permeated by electrolyte and lithium ions; (iii) it is capable of significantly retard/stop dendrites from growing at current densities 5-10 times higher than the allowed battery charging rate set by an external control circuit; and (iv) it has good mechanical properties during the range of temperatures where the battery is expected to operate, and must maintain mechanical integrity over extensive periods of immersion in an electrolyte.

Applications

The invention provides novel electrolytes that are thermally and electrochemically stable and promise to maintain higher lithium transference (i.e., battery rate capability) than existing electrolytes materials used in LIBs. The composite solid polymer electrolyte according to one or more embodiments is stable against high voltage (e.g., layered, spinel) and high capacity (e.g., sulfur) cathode materials that promise to more than double energy density of LIBs, but cannot be used effectively or safely with current electrolytes. Rechargeable battery technology incorporating the composite solid polymer electrolyte according to one or more embodiments will allow vehicles to use about 40% to 60% less petroleum than conventional vehicles, and permit driving at slow and high speeds using only electricity. This is a substantial increase in fuel economy. A high efficiency battery such as described in this proposal, displaces petroleum and dependence on foreign oil. There are also significant grid co-benefits as PHEVs will generally recharge at night using excess power from plants that cannot shut down completely, so they do not add to the peak load. This will help in grid management and electricity utilization.

High-energy, low-cost lithium batteries have the potential to reinvigorate the battery market and support the growth and development of clean energy technologies in the US. Better batteries will increase the wind and solar sector's efficiency and cost-competitiveness. Reducing man-made carbon dioxide emissions, nitrogen oxide emissions, and particulate matter, through batteries can reduce smog, acid rain, haze, and global climate change generally improving public health and protecting global ecosystems. Other benefits include improved national energy security, fewer trips to filling station, the convenience of home recharging, emergency backup power in the home, and vehicle-to-grid applications.

Examples:

The following Examples are provided to illustrate certain aspects of the present invention and to aid those of skill in the art in practicing the invention. These Examples are not to be considered to limit the scope of the invention in any manner.

| Sample | Ionic Liquid | Ionic Liquid Wt % | Crosslinker | Crosslinker Wt % |
|---|---|---|---|---|
| 1 | Jl2-99 | 50 | BPA-EO4 | 50 |
| 2 | Jl2-99 | 75 | BPA-EO4 | 25 |
| 3 | Jl2-99 | 50.5 | Ebecryl 3600 | 49.5 |
| 4 | Jl2-99 | 75.1 | Ebecryl 3600 | 24.9 |

UV-Crosslinkable Separator Formulations
1. JIL2-99 is 1-vinyl-3-hexylimidazolium bis(trifluoromethanesulfonyl)imide
2. BPA-EO4 is Bisphenol A ethoxylate diacrylate, MW 688 obtained from Aldrich Chemical 3. Ebecryl 3600 is a commercial uv curable acrylate obtained from Allnex All samples were formulated with 1 wt % v sensitizer coated on glass plate and cured on a Heraeus Fusion Solva at a belt speed of 3 ft/min.

Figure 13:
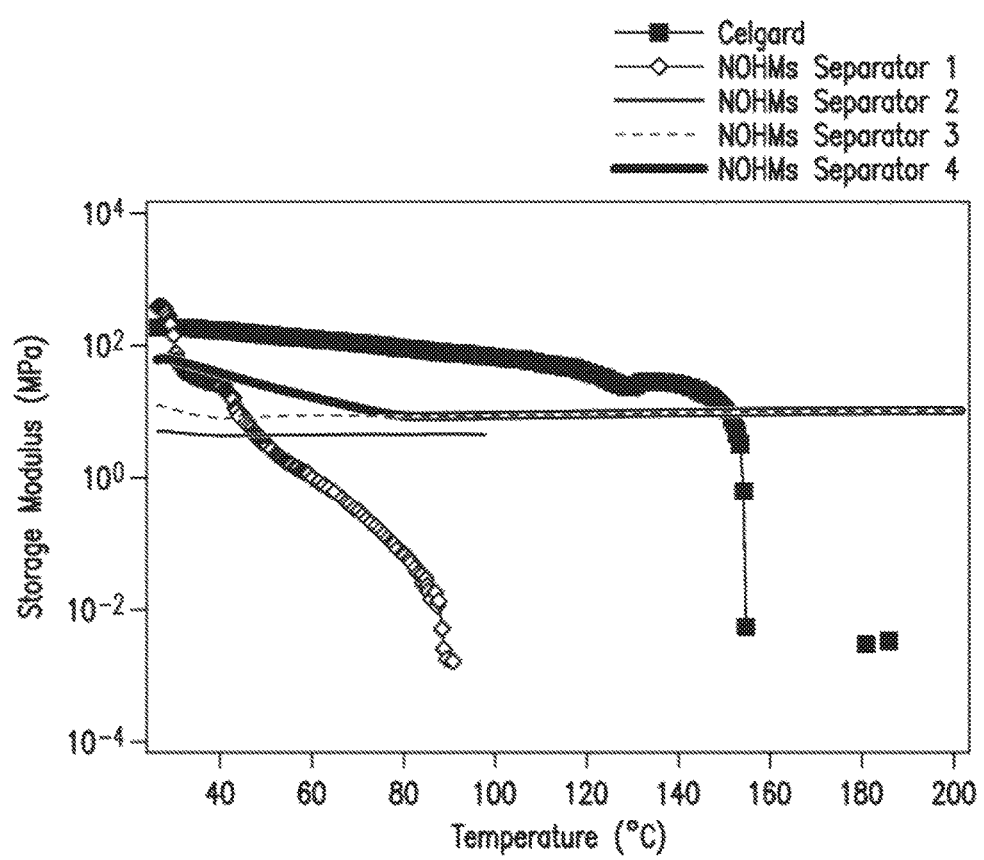
FIG. 13 is a plot of the storage modular versus temperature showing several composite ionic liquid-tethered nanoparticle/polymeric ionic liquid according to one or more embodiments.

The cured samples were analyzed by DMA under the following conditions:

The samples in the above example were cut in 8 mm wide strips and measured in tension using the RSA II DMA with a temperature sweep from 25 to 200 C at 1 Hz with a 5 C/min. heating rate with 1% strain and a static load of 1 gram. A plot of the plot of storage modulus versus temperature for the samples in the above examples are represented in FIG. 13.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A composite electrolyte comprising: a polymeric ionic liquid matrix; and
   a plurality of ionic liquid functionalized nanoparticles covalently linked to the polymeric ionic liquid matrix and uniformly dispersed therein, wherein the ionic liquid functionalized nanoparticles comprise at least one ionic liquid molecule comprising at least one of a first nitrogen cation moiety, a first phosphorus cation moiety, and a first sulfur cation moiety tethered to the nanoparticle.

2. The composite electrolyte of claim 1, wherein the polymeric ionic liquid matrix comprises a polymer backbone and a plurality of pendant groups, and wherein a plurality of cation moieties are located in one or more of the pendant groups or the polymer backbone, the cationic moieties being at least one cationic moieties selected from the group consisting of a second nitrogen cation moiety, a second phosphorus cation moiety, and a second sulfur cation moiety.

3. The composite electrolyte of claim 1, wherein the first nitrogen cation moiety is selected from the group consisting of imidazolium, ammonium, pyridinium, piperidinium, and pyrrolidinium moieties.

4. The composite electrolyte of claim 1, further comprising an alkali metal salt.

5. The composite electrolyte of claim 1, further comprising a non-polymerizable room temperature ionic liquid present in a range of 1% to 50% by weight of the composite electrolyte.

6. The composite electrolyte of claim 1, wherein the plurality of nanoparticles comprises a metal oxide material selected from the group consisting of silica, alumina, ceria, titania, vanadia, and zirconia metal oxide materials.

7. The composite electrolyte of claim 1, further comprising one or more aprotic solvents.

8. The composite electrolyte of claim 1, further comprising a multifunctional crosslinking agent.

9. The composite electrolyte of claim 8, wherein the crosslinking agent comprises a gemini ionic liquid moiety.

10. The composite electrolyte of claim 8, wherein the crosslinking agent comprises at least one cationic moieties selected from the group consisting of a third nitrogen cation moiety, a third phosphorus cation moiety, and a third sulfur cation moiety.

11. The composite electrolyte of claim 10, wherein the first nitrogen cation moiety is selected from the group consisting of imidazolium, ammonium, pyridinium, piperidinium, and pyrrolidinium moieties.

12. An electrochemical cell, comprising positive and negative electrodes spaced apart from each other by a composite electrolyte comprising:
    a polymeric ionic liquid matrix; and
    a plurality of ionic liquid functionalized nanoparticles covalently linked to the polymeric ionic liquid matrix and uniformly dispersed therein, wherein the ionic liquid functionalized nanoparticles comprise at least one ionic liquid molecule comprising at least one of a nitrogen cation moiety, a phosphorus cation moiety, and a sulfur cation moiety is tethered to the nanoparticle.

13. A method of making a composite electrolyte comprising:
    (1) forming a reaction mixture comprising:
       (i) a polymerizable monomer comprising at least one of a first nitrogen cation moiety, a first phosphorus cation moiety, and a first sulfur cation moiety, and
       (ii) a plurality of functionalized nanoparticles, wherein at least one of a second nitrogen cation moiety, a second phosphorus cation moiety, and a second sulfur cation moiety is tethered to the nanoparticle; and
    (2) initiating polymerization in the reaction mixture to form a polymeric ionic liquid matrix, wherein the functionalized nanoparticles are covalently linked to and embedded in the polymeric ionic liquid matrix.

14. The method of claim 13, wherein the polymerization is a free radical polymerization reaction.

15. The method of claim 13, further comprising an initiator in the reaction mixture.

16. The method of claim 13, further comprising an alkali metal salt in the reaction mixture.

17. The method of claim 13 wherein the polymerizable monomer comprises a styrenic, (meth)acryloyl, vinyl, allyl, acrylic, or methacrylic moiety.

18. The method of claim 13, wherein the polymerization is initiated by a source of energy selected from the group consisting of heat, ultraviolet energy, electrode bombardment, and microwave energy.

19. The method of claim 18, wherein the polymerization is initiated by ultraviolet energy.

20. The method of claim 13, further comprising a multifunctional crosslinking agent in the reaction mixture.

21. The method of claim 20, wherein the crosslinking agent comprises a gemini ionic liquid moiety.

22. The method of claim 20, wherein the crosslinking agent comprises at least one cationic moiety selected from the group consisting of a third nitrogen cation moiety, a third phosphorus cation moiety, and a third sulfur cation moiety.

23. The method of claim 22, wherein the first nitrogen cation moiety is selected from the group consisting of imidazolium, ammonium, pyridinium, piperidinium, and pyrrolidinium moieties.

* * * * *